(12) United States Patent
Han

(10) Patent No.: US 7,699,531 B2
(45) Date of Patent: Apr. 20, 2010

(54) WHEEL END ASSEMBLY

(75) Inventor: Ki Ho Han, Gyeongsangbuk-do (KR)

(73) Assignee: Iljin Bearing, Gyeongsangbuk-do (KR)

( * ) Notice: Subject to any disclaimer, the term of this patent is extended or adjusted under 35 U.S.C. 154(b) by 1173 days.

(21) Appl. No.: 11/262,721

(22) Filed: Nov. 1, 2005

(65) Prior Publication Data

US 2006/0193547 A1 Aug. 31, 2006

(30) Foreign Application Priority Data

Feb. 28, 2005 (KR) .................. 10-2005-0016535

(51) Int. Cl.
*F16C 13/00* (2006.01)
*F16C 35/00* (2006.01)
(52) U.S. Cl. ............... 384/544; 301/105.1; 301/132
(58) Field of Classification Search ................ 384/544, 384/562, 589; 301/130, 132, 105.1
See application file for complete search history.

(56) References Cited

U.S. PATENT DOCUMENTS

| | | | | |
|---|---|---|---|---|
| 3,589,747 A | * | 6/1971 | Asberg | 280/105 |
| 3,806,214 A | * | 4/1974 | Keiser | 384/589 |
| 4,958,944 A | * | 9/1990 | Hofmann et al. | 384/512 |
| 6,079,512 A | | 6/2000 | Krisher | |

* cited by examiner

*Primary Examiner*—William C Joyce
(74) *Attorney, Agent, or Firm*—Rosenberg, Klein & Lee

(57) ABSTRACT

A wheel end assembly includes a carrier and a wheel bearing assembly, and an outside inner race is integrally formed with a spindle of the wheel bearing assembly. The wheel end assembly includes: a carrier having a cylindrical member on its one side and a second through pipe on its other side; and a wheel bearing assembly comprising a spindle integrally formed with an outside inner race on its one side and having an insert groove on its other side, a hub having an outer race having ball receiving members receiving balls, an inside inner race provided on the inner side of the outer race by pressurization, and a seal member sealing a gap between the inside inner race and the outer race.

2 Claims, 5 Drawing Sheets

ND ASSEMBLY

BACKGROUND OF THE INVENTION

1. Field of the Invention

The present invention relates to a wheel end assembly, and more particularly, to a wheel end assembly having an outside inner race integrated spindle, wherein an outside inner race and a spindle are integrally formed.

2. Background of the Related Art

As illustrated in FIG. 1, a conventional wheel end assembly includes a carrier 1 and a wheel bearing assembly 3.

The carrier 1 is installed in a suspension (not shown) and the wheel bearing assembly 3 is connected to the carrier 1 by a spindle 2.

According to the conventional wheel end assembly, after the spindle 2 is pressurized to the carrier 1 in the inner side of a vehicle, the wheel bearing assembly 3 is assembled into the spindle 2. Also, a nut 6 and a washer 6a are provided on a projection portion of the spindle 2 passing through the wheel bearing assembly 3 and extending outwardly from a vehicle, so as to assemble the wheel bearing assembly 3 into the carrier 1.

The wheel bearing assembly 3 assembled into the carrier 1 includes an outer race 4, an inner race 5, a plurality of balls 3a and 3c, and ball receiving members 3b and 3d.

A flange 2a is formed on the other end of the spindle 2 such that the spindle 2 assembled into the wheel bearing assembly 3 is hooked to the carrier 1 in the inner side of a vehicle (not shown) when the carrier 1 is pressurized. Also, when the wheel bearing assembly 3 is assembled into the carrier 1, the spindle 2 is formed to extend outwardly from a vehicle.

A process of assembling the wheel bearing assembly 3 into the carrier 1 by using the conventional spindle 2 will be described below.

Ball receiving members 3b and 3d receiving the balls 3a and 3c are provided on the inner side of the outer race 4 where a hub bolt 4a is mounted. The inner race 5 includes an outside inner race 5a and an inside inner race 5b, and is provided in the inner side of the outer race 4.

The outside inner race 5a is provided on one side of the outer race 4 to make contact with the ball receiving member 3b receiving the ball 3a. The inside inner race 5b is provided on the other side of the outer race 4 to make contact with the ball receiving member 3d receiving the ball 3c.

When the ball receiving members 3b and 3d receiving the balls 3a and 3c are provided on the inner side of the outer race 4 and the inner race 5 having the outside inner race 5a and the inside inner race 5b are installed thereon, a shield member 7a and a seal member 7b are interposed between the outer race 4 and the inner race 5.

The shield member 7a is inserted in the direction of one side of the outer race 4 to be interposed between the outer race 4 and the outside inner race 5a. The seal member 7b are inserted in the direction of the other side of the outer race 4 to be interposed between the outer race 4 and the inside inner race 5b. In this manner, a gap between the outer race 4 and the inner race 5 is sealed.

When the shield member 7a and the seal member 7b are interposed between the outer race 4 and the inner race 5, pressure is supplied to the carrier 1 and the wheel bearing assembly 3 is pressurized to the spindle 2. Namely, the outer race 4 having the ball receiving members 3b and 3d, the shield member 7a and the seal member 7b on its inner side is provided on the spindle 2 through the pressurization. The washer 6a and the nut 6 are fixed to a projection portion of the spindle 2, and the wheel bearing assembly 3 is assembled into the spindle 2.

In this instance, a wheel speed sensor target 8 illustrated in FIG. 1 is provided on the outer circumference of the outer race 4 and senses the rotation speed of a wheel (not shown).

As described above, an inner race of a conventional wheel end assembly includes an outside inner race and an inside inner race. Thus, the number of assembly parts increases which also makes an assembly process complicated and increases manufacture and assembly cost.

SUMMARY OF THE INVENTION

An object of the present invention is to provide a wheel end assembly having an outside inner race integrated spindle, wherein an outside inner race and a spindle are integrally formed.

It is other object of the present invention to provide a wheel end assembly which can be reduced the number of assembly parts and can be simplified the structure of the wheel end assembly.

It is another object of the present invention to provide a wheel end assembly which can be saved manufacture and assembly cost.

According to an embodiment of the present invention, there is provided a wheel end assembly including: a carrier having a first through pipe and a cylindrical member on its one side, and a second through pipe on its other side; and a wheel bearing assembly comprising a spindle integrally formed with an outside inner race on its one side and having an insert groove on its other side, a hub having an outer race having ball receiving members receiving balls on its inner side, an inside inner race provided on the inner side of the outer race by pressurization, and a seal member sealing a gap between the inside inner race and the outer race.

According to another embodiment of the present invention, there is provided a wheel end assembly including; a carrier having a cylindrical member on its one side and a second through pipe on its other side and having a first through pipe to pass through the cylindrical member; and a wheel bearing assembly comprising a spindle integrally formed with an outside inner race on its one side and having a thread portion on its other side, a hub having an outer race having ball receiving members receiving balls, an inside inner race provided on the inner side of the outer race by pressurization, and a seal member sealing a gap between the inside inner race and the outer race.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

A wheel end assembly according to an embodiment of the present invention will be described in detail with reference to the accompanying drawings.

Figure 1:
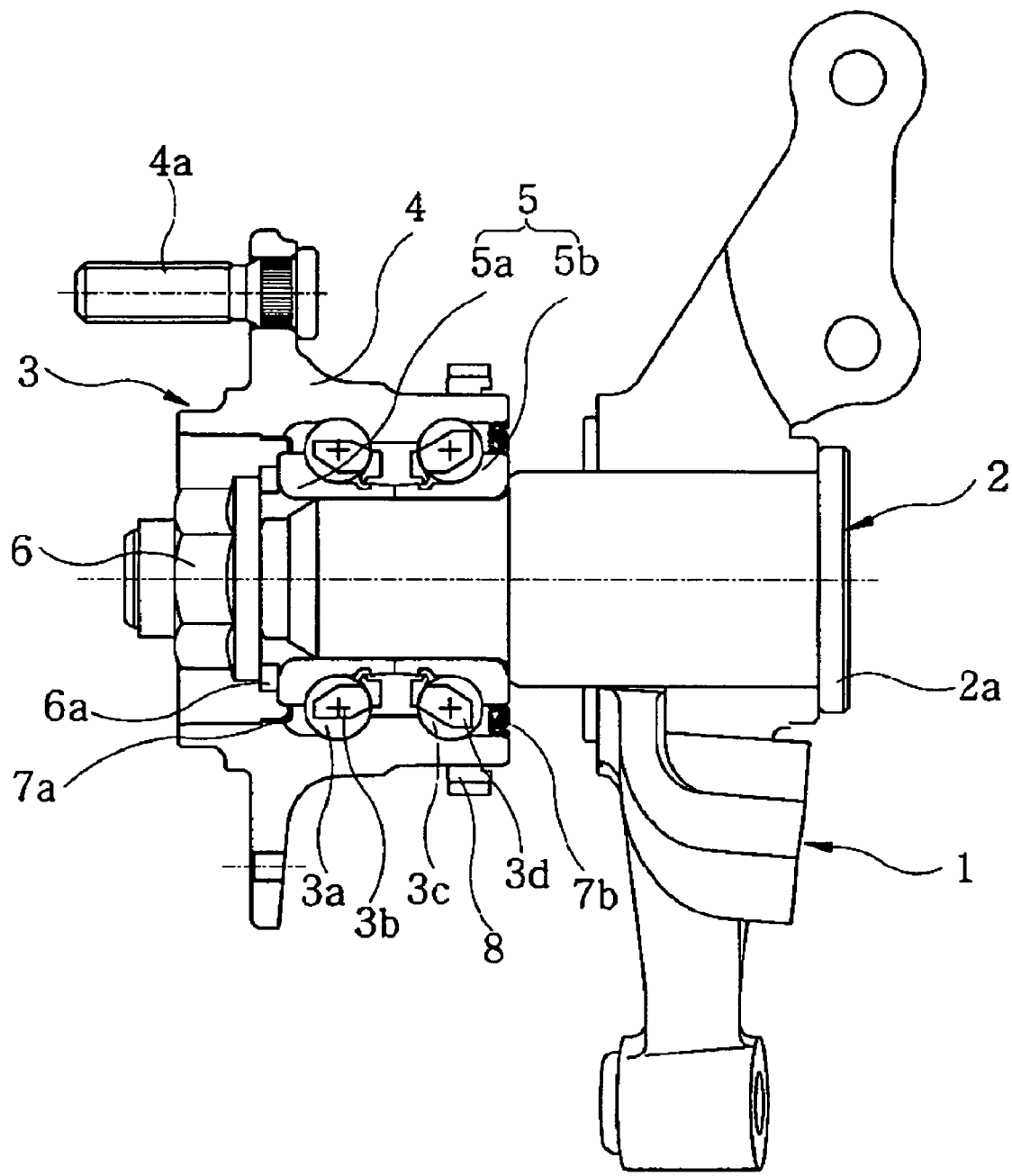
FIG. 1 is an assembly-sectional view of a conventional wheel end assembly.
Figure 2:
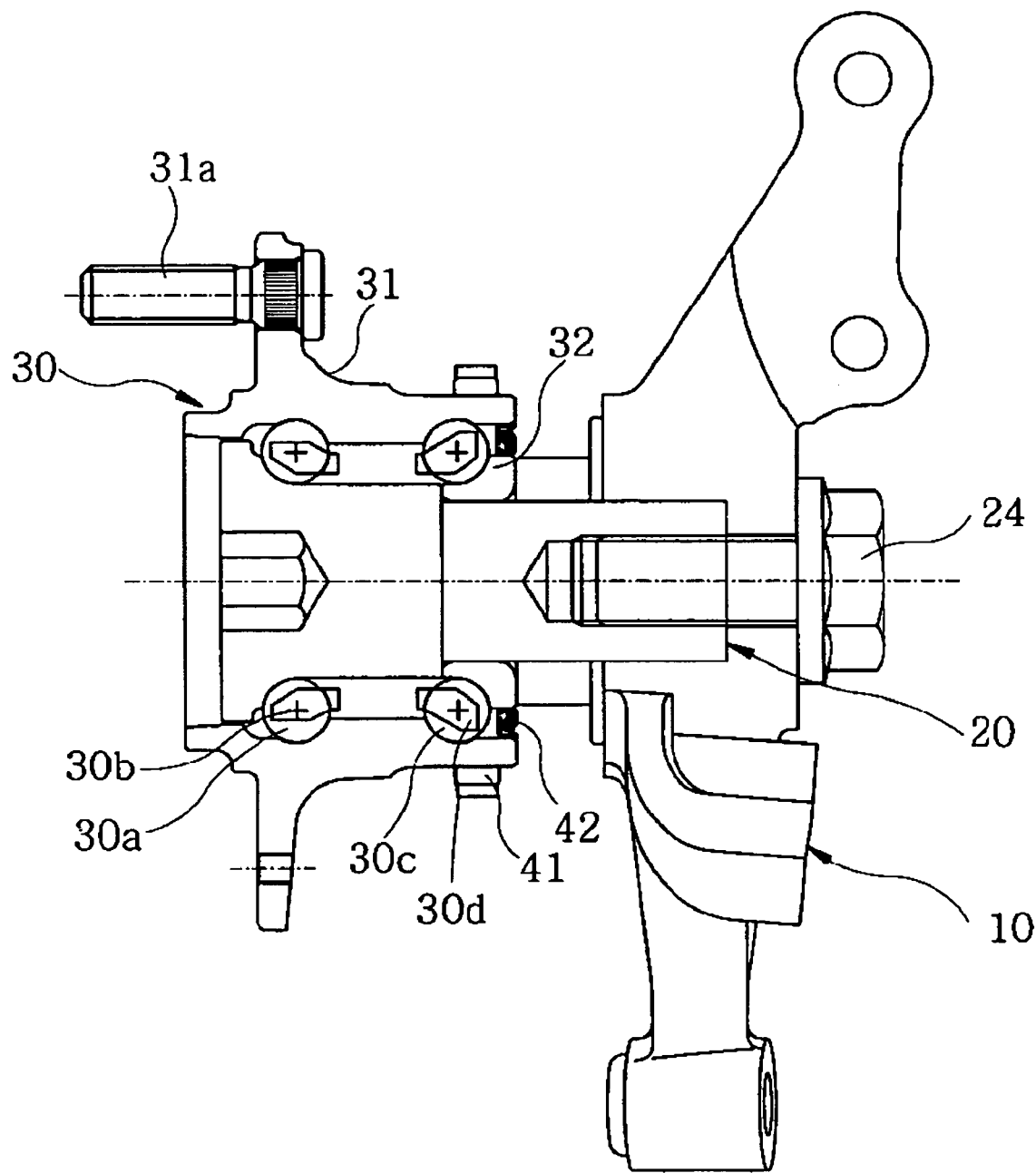
FIG. 2 is an assembly-sectional view of a wheel end assembly according to an embodiment of the present invention.
Figure 3:
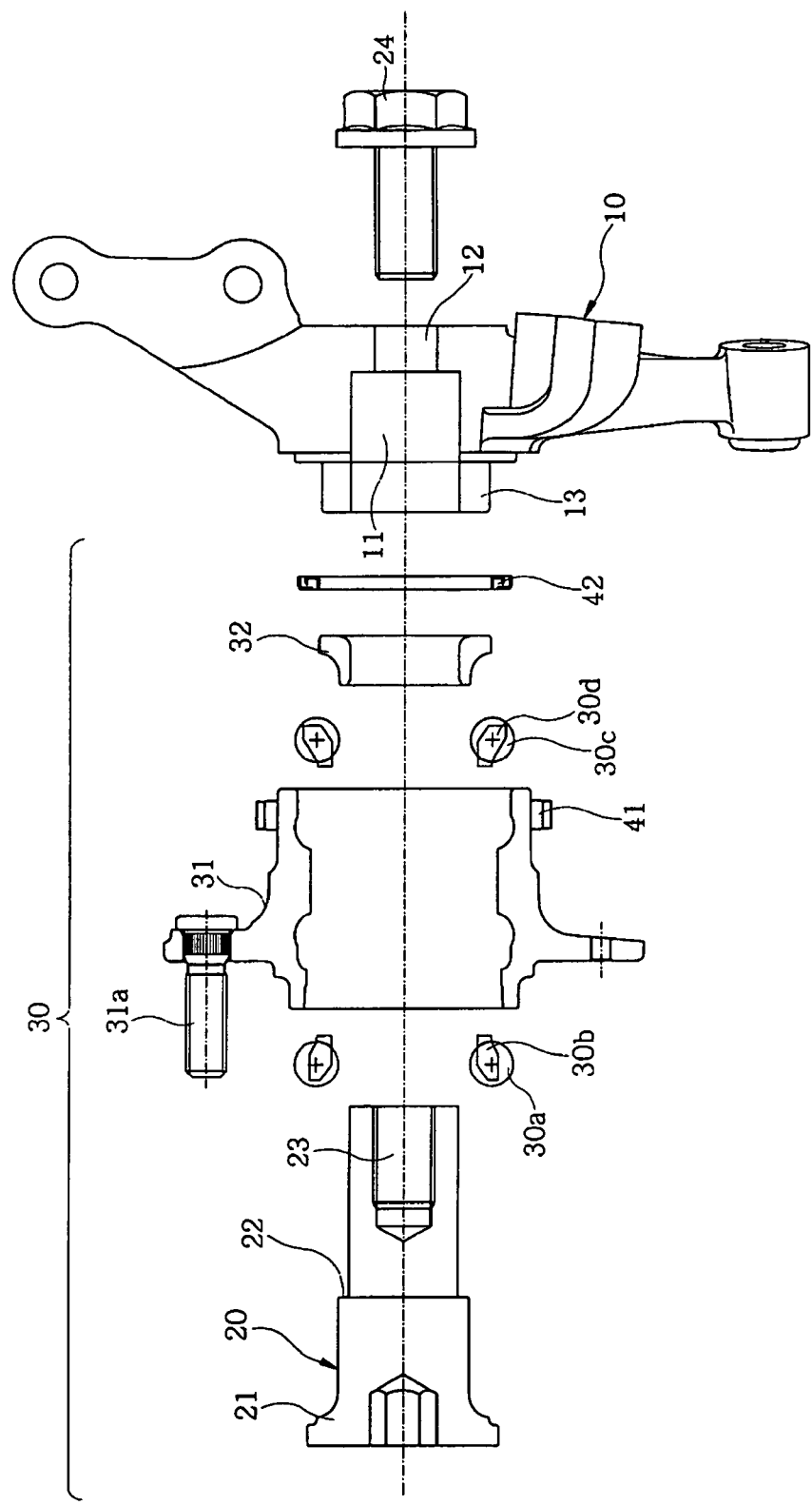
FIG. 3 is an exploded assembly view of FIG. 2.

FIG. 2 is an assembly-sectional view of a wheel end assembly according to an embodiment of the present invention, and FIG. 3 is an exploded assembly view of FIG. 2.

As illustrated in FIGS. 2 and 3, the wheel end assembly of the present invention includes a carrier 10 and a wheel bearing assembly 30.

The carrier 10 has a cylindrical member 13 on its one side and a second through pipe 12 on its other side. The cylindrical member 13 is formed to pass through a first through pipe 11 and the second through pipe 12.

The inner diameter of the cylindrical member 13 is almost same to the diameter of the first through pipe 11. Also, the diameter of the first through pipe 11 is formed to be larger than the diameter of the second through pipe 12. A symbol 24 not described herein is a fixing member and adopts a bolt herein.

In the meantime, the wheel bearing assembly 30 includes a spindle 20, a hub 31, an inside inner race 32 and a seal member 42.

An outside inner race 21 is integrally formed with the spindle 20 on one side of the spindle 20. An insert groove 23 is formed on the other side of the spindle 20. A screw thread (not shown) is formed on the inside of the insert groove 23. Also, a protrude portion 22 is formed on a predetermined part of the center of the spindle 20 to support one side of the inside inner race 32.

The hub 31 includes an outer race 31b having ball receiving members 30b and 30d receiving balls 30a and 30c on the inner side of the outer race 31b. The ball receiving members 30b and 30d receive a plurality of balls 30a and 30c and are provided on the inner side of the outer race 31b.

A hub bolt 31a is mounted on one side of the hub 31 to combine a wheel (not shown). A symbol 41 not described herein is a wheel speed sensor target and used for detecting the rotation speed of a wheel.

The inside inner race 32 is pressurized to be provided on the inner side of the outer race 31b. The seal member 42 is provided to seal a gap between the inside inner race 32 and the outer race 31b.

That is, when the inside inner race 32 is provided on the inner side of the outer race 31b, the seal member 42 is interposed between the other end of the outer race 31b and the inside inner race 32.

An assembly and operation of the wheel end assembly according to an embodiment of the present invention constructed as above will be described below.

First, the ball receiving members 30b and 30d receiving the balls 30a and 30c are provided on the inner side of the outer race 31b and later, the spindle 20 is provided on the inner side of the outer race 31b.

After the inside inner race 32 and the seal member 42 are pressurized to be interposed between the outer race 31b and the spindle 20, the spindle 20 is inserted into the first through pipe 11 of the carrier 10.

When the spindle 20 is pressurized to be provided on the outer race 31b, the spindle 20 is first provided on the outer race 31b, and the inside inner race 32 and the seal member 42 are sequentially provided by pressurization.

When the fixing member 24 is coupled with the second through pipe 12 of the carrier 10 and the insert groove 23 of the spindle 20, the wheel bearing assembly 30 is assembled into the carrier 10.

Figure 4:
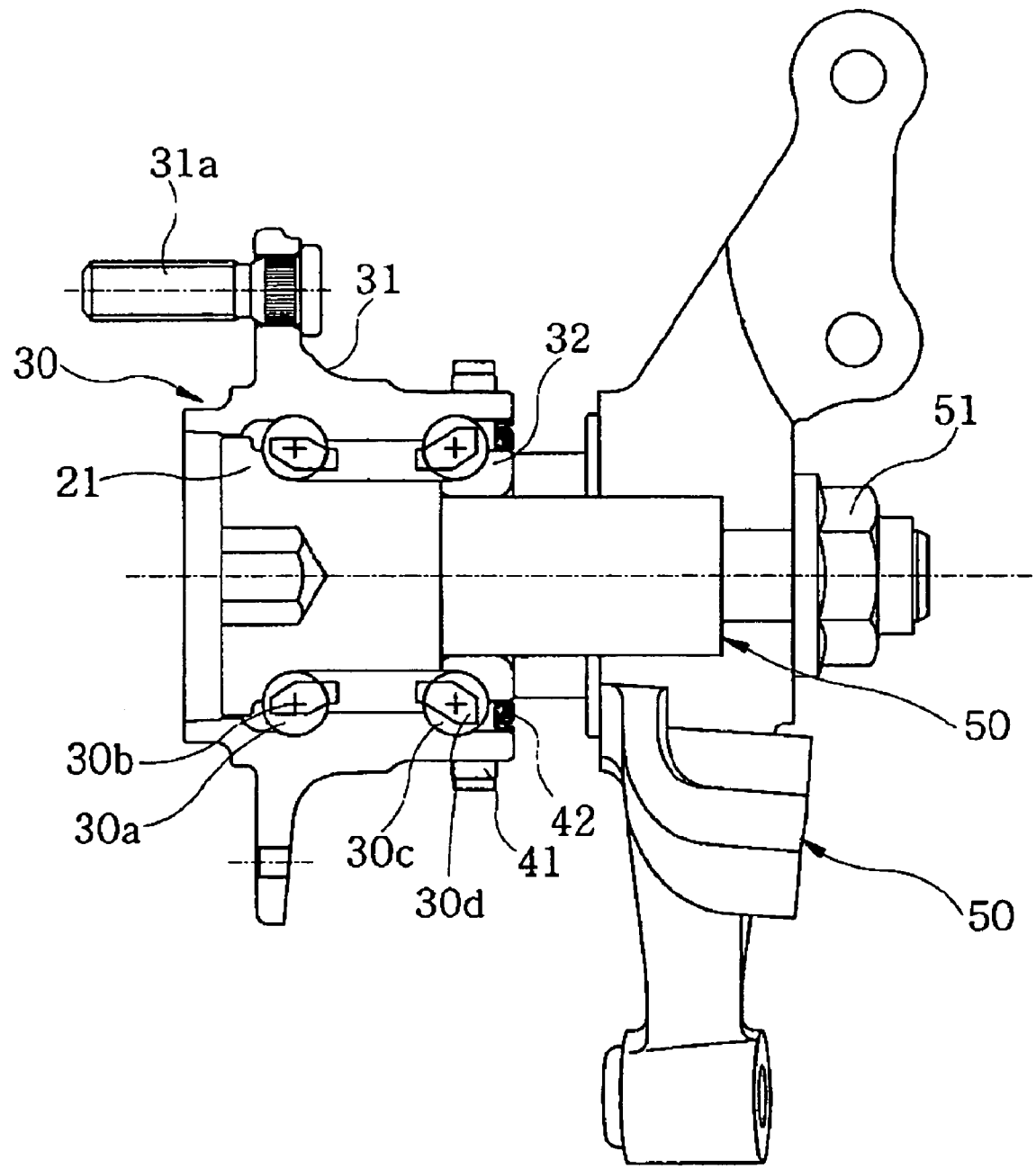
FIG. 4 is an assembly-sectional view of a wheel end assembly according to another embodiment of the present invention.
Figure 5:
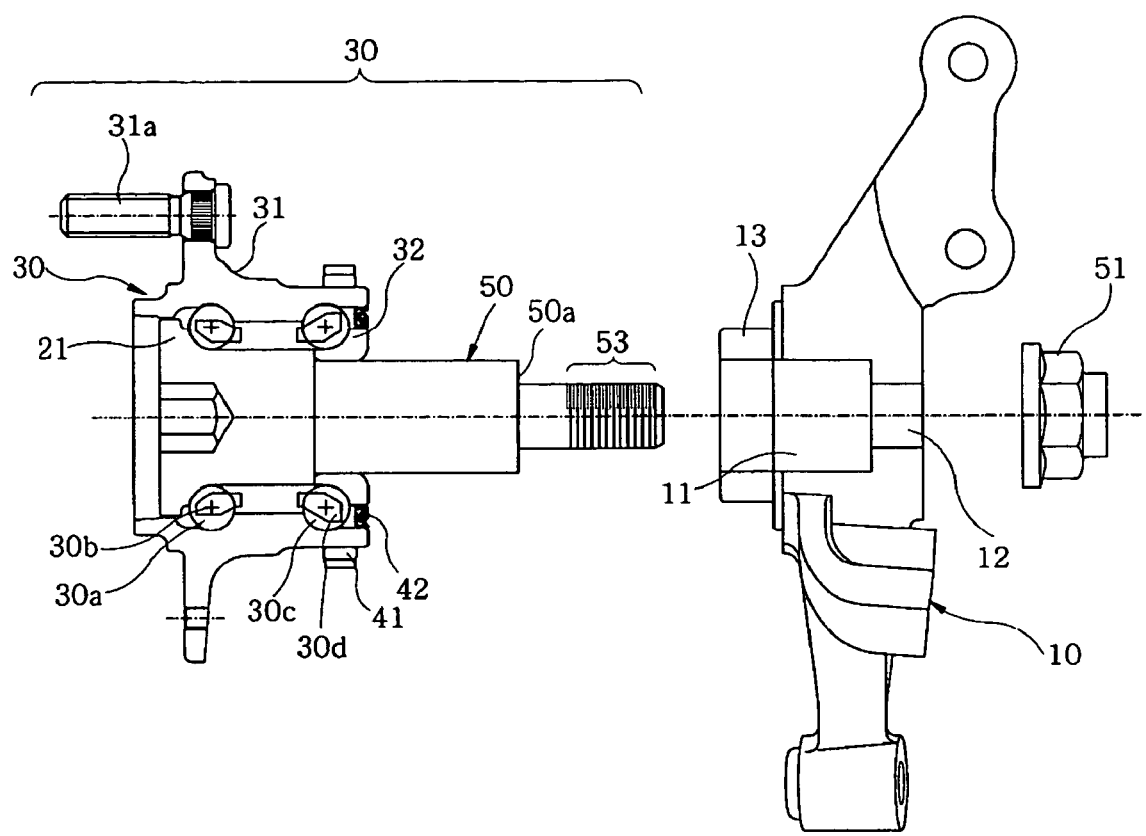
FIG. 5 is an exploded assembly view of FIG. 4.

FIG. 4 is an assembly-sectional view of a wheel end assembly according to another embodiment of the present invention, and FIG. 5 is an exploded assembly view of FIG. 4.

As described in the previous embodiment, the wheel end assembly according to another embodiment of the present invention also includes a carrier 10 and a wheel bearing assembly 30.

In this instance, the configuration of the carrier 10 is same to the configuration of the aforementioned embodiment and the description related thereto will be omitted here.

The wheel bearing assembly 30 includes a spindle 50, a hub 31, an inside inner race 32 and a seal member 42.

An outside inner race 21 is integrally formed with the spindle 50 on one side of the spindle 50. A thread portion 53 is formed on the other side of the spindle 50. Also, a protrude portion 50a is formed on a predetermined part of the center of the spindle 50 to support one side of the inside inner race 32.

When the spindle 50 is inserted into first and second through pipes 11 and 12, the thread portion 53 is protruded from the carrier 10 in the other end direction thereof.

The configuration of the hub 31, the inside inner race 32, and the seal member 42 of the wheel bearing assembly 30 is same as described in the previous embodiment and the description related thereto will be omitted herein.

In the meantime, a symbol 51 not described herein is a nut 51 and the nut 51 is combined with the thread portion 53 of the spindle 50.

An assembly and operation of the wheel end assembly according to another embodiment of the present invention constructed as above will be described below.

First, the ball receiving members 30b and 30d receiving the balls 30a and 30c are provided on the inner side of the outer race 31b. The spindle 50 is provided on the inner side of the outer race 31b.

After the inside inner race 32 and the seal member 42 are pressurized to be interposed between the outer race 31b and the spindle 20, the spindle 50 is inserted into the first through pipe 11 of the carrier 10.

When the spindle 50 is pressurized to be provided on the inner side of the outer race 31b, the spindle 50 is first provided on the outer race 31b, and the inside inner race 32 and the seal member 42 are sequentially provided by pressurization.

When the nut 51 is combined with the thread portion 53 of the spindle 50 through the second through pipe 12 of the carrier 10, the wheel bearing assembly 30 is assembled into the carrier 10.

As described above, by assembling a wheel bearing assembly by using an outside inner race integrated spindle where a spindle and an outside inner race are integrally formed and installing the spindle into a carrier by using a fixing member, the structure of the wheel bearing assembly is simplified and the assembly itself becomes easier.

Since a wheel end assembly of the present invention integrally forms a spindle and an outside inner race, the structure of the wheel end assembly can be simplified and the number of assembly parts can be reduced.

Also, since the number of assembly part is reduced, manufacture and assembly cost can be saved.

What is claimed is:

1. A wheel end assembly comprising:

a carrier having a first through pipe and a cylindrical member on one side thereof, and a second through pipe on an opposing side of the carrier; the first through pipe being formed at an inner circumference of the cylindrical member and being connected to the second through pipe; and a wheel bearing assembly comprising a spindle integrally formed with an outside inner race on one side thereof and having an insert groove on an opposing side of the spindle, a hub having an outer race having ball receiving members receiving balls and connected to a wheel at one side of the hub, an inside inner race provided on the inner side of the outer race by pressurization and axially supported by the cylindrical member of the carrier, and a seal member sealing a gap between the inside inner race and the outer race, wherein a protruding portion is formed on the spindle of the wheel bearing assembly for supporting one side of the inside inner race and is inserted in the first through pipe through the hub and the inside inner race, wherein the wheel bearing assembly and the carrier are assembled by threading a fixing member into the insert groove through the second through pipe; and wherein a wheel speed sensor target is mounted at an outer circumference of the hub.

2. The wheel end assembly of claim 1, wherein the fixing member is a bolt.

* * * * *